US009178927B2

(12) United States Patent
Williams et al.

(10) Patent No.: US 9,178,927 B2
(45) Date of Patent: Nov. 3, 2015

(54) TRANSMITTING AND RECEIVING MEDIA PACKET STREAMS

(75) Inventors: Aidan Williams, Chifley (AU); Andrew White, Ingleburn (AU)

(73) Assignee: Audinate Pty Limited, Ultimo, NSW (AU)

( * ) Notice: Subject to any disclaimer, the term of this patent is extended or adjusted under 35 U.S.C. 154(b) by 1013 days.

(21) Appl. No.: 12/308,187

(22) PCT Filed: May 17, 2007

(86) PCT No.: PCT/AU2007/000668
§ 371 (c)(1),
(2), (4) Date: Oct. 28, 2009

(87) PCT Pub. No.: WO2007/131297
PCT Pub. Date: Nov. 22, 2007

(65) Prior Publication Data
US 2010/0046383 A1    Feb. 25, 2010

(30) Foreign Application Priority Data

May 17, 2006    (AU) ................................ 2006902741
Oct. 19, 2006   (AU) ................................ 2006906015

(51) Int. Cl.
*H04L 29/06*   (2006.01)
*H04L 12/54*   (2013.01)
(Continued)

(52) U.S. Cl.
CPC .......... *H04L 65/604* (2013.01); *H04L 12/5693* (2013.01); *H04L 47/564* (2013.01);
(Continued)

(58) Field of Classification Search
None
See application file for complete search history.

(56) References Cited

U.S. PATENT DOCUMENTS 5,682,384 A    10/1997  Zarros
6,175,604 B1    1/2001  Noro et al.
(Continued)

FOREIGN PATENT DOCUMENTS

EP    1148687    10/2001
EP    1398931     5/2006
(Continued)

OTHER PUBLICATIONS

International Search Report dated Jun. 13, 2007 for PCT/AU2007/000668.
(Continued)

*Primary Examiner* — Frederick Bailey
(74) *Attorney, Agent, or Firm* — Jones Day

(57) ABSTRACT

This invention concerns the transmitting and receiving of digital media packets, such as audio and video channels and lighting instructions. The network (104) is comprised of at least a transmitter device (110) and a receiving device (112). The controllers (122) and (126) of these devices handle the exchanging of configuration messages between the devices (110) and (112). Using the invention, the user is not required to manually configure the processor to receive media packet streams. Instead, a controller (126) of a receiving device (112) operates to receive information on a user selection of media channels and automatically configure the processor of the transmitter device. Further, the receiving device (112) is able to receive media channels using both unicast and multicast protocols. Media channels can be given textual labels which are unique on the unique (104) and easily identify to the user the actual source of the media channel. Media channels of different formats to be sent on the same net work simultaneous. Further, redundant media channels are easily accommodated.

21 Claims, 10 Drawing Sheets

(51) Int. Cl.
*H04L 12/875* (2013.01)
*H04L 12/861* (2013.01)
*H04L 12/879* (2013.01)
*H04N 21/439* (2011.01)

(52) U.S. Cl.
CPC ............ *H04L 49/90* (2013.01); *H04L 49/901* (2013.01); *H04L 65/4076* (2013.01); *H04L 65/4092* (2013.01); *H04L 65/60* (2013.01); *H04L 65/602* (2013.01); *H04N 21/4392* (2013.01)

(56) References Cited

U.S. PATENT DOCUMENTS

| | | | |
|---|---|---|---|
| 6,360,271 | B1 | 3/2002 | Schuster et al. |
| 6,553,040 | B2 | 4/2003 | Bernath et al. |
| 6,611,537 | B1 | 8/2003 | Edens et al. |
| 6,661,804 | B2 | 12/2003 | Fellman et al. |
| 6,665,308 | B1 | 12/2003 | Rakib et al. |
| 6,675,314 | B1 | 1/2004 | Yamada et al. |
| 6,763,479 | B1 | 7/2004 | Hebert |
| 6,857,080 | B1 | 2/2005 | Liang |
| 7,000,031 | B2 | 2/2006 | Fischer et al. |
| 7,096,271 | B1 | 8/2006 | Omoigui et al. |
| 7,206,367 | B1 | 4/2007 | Moore |
| 7,325,043 | B1* | 1/2008 | Rosenberg et al. ........... 709/219 |
| 7,342,890 | B1 | 3/2008 | Ferguson |
| 7,551,647 | B2 | 6/2009 | Fellman et al. |
| 7,747,725 | B2 | 6/2010 | Williams et al. |
| 2001/0038674 | A1 | 11/2001 | Trans |
| 2002/0136198 | A1 | 9/2002 | Findikli |
| 2002/0150053 | A1 | 10/2002 | Gray, III et al. |
| 2003/0093703 | A1 | 5/2003 | Oliver et al. |
| 2003/0108331 | A1* | 6/2003 | Plourde et al. ................. 386/83 |
| 2003/0149894 | A1* | 8/2003 | Bellinger et al. ............. 713/201 |
| 2003/0156603 | A1 | 8/2003 | Rakib et al. |
| 2003/0223409 | A1 | 12/2003 | Wiebe |
| 2003/0235216 | A1 | 12/2003 | Gustin |
| 2003/0236904 | A1 | 12/2003 | Walpole et al. |
| 2004/0001435 | A1 | 1/2004 | Wong |
| 2004/0052209 | A1 | 3/2004 | Ortiz |
| 2004/0062278 | A1 | 4/2004 | Hadzic et al. |
| 2004/0100942 | A1 | 5/2004 | Blank et al. |
| 2004/0228367 | A1 | 11/2004 | Mosig |
| 2004/0234000 | A1 | 11/2004 | Page |
| 2004/0252400 | A1 | 12/2004 | Blank et al. |
| 2005/0021725 | A1* | 1/2005 | Lobbert ......................... 709/223 |
| 2005/0036512 | A1 | 2/2005 | Loukianov |
| 2005/0039065 | A1 | 2/2005 | Cheung et al. |
| 2005/0138459 | A1 | 6/2005 | Yoon et al. |
| 2005/0166135 | A1 | 7/2005 | Burke et al. |
| 2005/0180568 | A1* | 8/2005 | Krause .......................... 380/212 |
| 2005/0201399 | A1 | 9/2005 | Woodward et al. |
| 2005/0288805 | A1 | 12/2005 | Moore et al. |
| 2006/0005099 | A1 | 1/2006 | Strasman et al. |
| 2006/0013262 | A1 | 1/2006 | Downey et al. |
| 2006/0013263 | A1 | 1/2006 | Fellman |
| 2006/0056432 | A1 | 3/2006 | Azarov |
| 2006/0072578 | A1 | 4/2006 | Alfano |
| 2006/0135258 | A1 | 6/2006 | Maheshwari et al. |
| 2006/0161835 | A1 | 7/2006 | Panabaker et al. |
| 2006/0167761 | A1* | 7/2006 | Elcock et al. ................... 705/26 |
| 2006/0174266 | A1* | 8/2006 | Gatto et al. ..................... 725/37 |
| 2006/0280182 | A1 | 12/2006 | Williams et al. |
| 2007/0002886 | A1 | 1/2007 | Lanigan et al. |
| 2007/0061480 | A1* | 3/2007 | Scoredos ...................... 709/231 |
| 2007/0076727 | A1 | 4/2007 | Shei |
| 2007/0081562 | A1 | 4/2007 | Ma |
| 2007/0206507 | A1* | 9/2007 | Reichman et al. ............ 370/252 |
| 2007/0280123 | A1 | 12/2007 | Atkins et al. |
| 2008/0133766 | A1* | 6/2008 | Luo ............................... 709/231 |
| 2008/0187282 | A1 | 8/2008 | Brady et al. |
| 2009/0274149 | A1 | 11/2009 | Williams et al. |
| 2010/0046383 | A1 | 2/2010 | Williams et al. |
| 2010/0189078 | A1* | 7/2010 | Famolari ....................... 370/331 |
| 2010/0228881 | A1 | 9/2010 | Williams et al. |
| 2010/0235486 | A1 | 9/2010 | White et al. |
| 2011/0002429 | A1 | 1/2011 | Williams et al. |

FOREIGN PATENT DOCUMENTS

| | | |
|---|---|---|
| WO | WO 00/72509 | 11/2000 |
| WO | WO 2004/008738 | 1/2004 |
| WO | WO 2005/006621 | 1/2005 |
| WO | WO 2006/057992 | 1/2006 |
| WO | WO 2007/131296 | 11/2007 |
| WO | WO 2007/131297 | 11/2007 |
| WO | WO 2008/138047 | 11/2008 |
| WO | WO 2009/105838 | 3/2009 |

OTHER PUBLICATIONS

Blank et al. "An Internet Protocol (IP) Sound System," AES (Audio Engineering Society) 117th Convention San Francisco, CA (Oct. 2004).

David V. James; "Transmit State Machines"; IEEE 802.3 Residential Ethernet Study Group presentation; Sep. 21, 2005; pp. 107-121.

Felix F. Feng; "On the worst case, and pacing"; IEEE 802.3 Residential Ethernet Study Group presentation; Sep. 30, 2005; slides 1-17.

Geoffrey M. Garner; "Delay and Delay Variation Simulation Results for Additional Multi-hop Conventional Ethernet Cases with Bursting/Bunching"; IEEE 802.3 Residential.

Geoffrey M. Garner; "Delay and Delay Variation Simulation Results for Multi-hop Conventional Ethernet Cases with Bursting/Bunching"; IEEE 802.3 Residential.

John Nels Fuller; "Calculating the Delay Added by Qav Stream Queue"; IEEE 802.1Qav presentation; Aug. 12, 2009; pp. 1-4.

Max Azarov; "On worst-case Latency for Ethernet networks and alternative shaping concept"; IEEE 802.3 Residential Ethernet Study Group.

Max Azarov; "Worst-case Ethernet Network Latency for Shaped Sources"; IEEE 802.3 Residential Ethernet Study Group presentation; Oct. 7, 2005; pp. 1-12.

Max Azarov; "Worst-case Ethernet Network Latency"; IEEE 802.3 Residential Ethernet Study Group presentation; Sep. 26, 2005; pp. 1-4.

Yamaha Systems Solutions white paper, Networked audio system design with CobraNet, 16 pages, 2006.

Gross, et al. "Deploying Real-Time Ethernet Networks", AES UK Conference, pp. 90-101.

Kinkradt et al. "A Comparative Study of mLAN and CobraNet Technologies and their use in the Sound Installation Industry", Audio Engineering Society, Mar. 22-25, 2003.

* cited by examiner

FIG.4(a)

TRANSMITTING AND RECEIVING MEDIA PACKET STREAMS

CROSS REFERENCE TO RELATED APPLICATION

This application is the National Phase application of International Application No. PCT/AU2007/000668, filed 17 May 2007, which designates the United States and was published in English. This application, in its entirety, is incorporated herein by reference.

TECHNICAL FIELD

This invention concerns the transmitting and receiving of digital media packets, such as audio and video channels and lighting instructions. For example, but not limited to, the invention concerns the use of an Internet Protocol (IP) computer network to transmit media channels generated by media devices in a manner that meets high fidelity requirements. The media channels are transmitted as media packets from a transmitter device to a receiver device for playout. The invention concerns a transmitter device, a receiver device, instruction messages, methods of receiving and transmitting media packet streams, computer software to perform these methods and a data network.

BACKGROUND ART

Media channels, such as audio and video channels, have long been transmitted using application specific cables. For instance, two-core speaker cable is used to carry left and right audio channels from amplifiers to speakers.

More recently, media signals have been transmitted on computer based networks using protocols such as unicast or multicast. Unicast is a method of sending packets on a computer network to a single destination. The unicast packets must be retransmitted for every media device that wishes to receive the packets.

Multicast is typically used to refer to IP multicast, which is a protocol for efficiently sending to multiple receiver devices at the same time on TCP/IP networks by use of a multicast address. The computer network then operates to route the packets to each of the devices on the network that wish to receive the multicast packets.

Examples of computer based network designed to transport digital media is the computer network marketed by Telos. The Telos computer network operates using the multicast protocol and carries one channel of information per multicast stream of packets. All data transmitted on the computer network is homogenous. Each packet contains samples from a single channel, and all channels transmitted over the network use a 48 kHZ sampling rate and 20 bits of data per sample. By keeping the packet and sample formats homogeneous the Telos system always knows how to interpret an incoming packet. All it needs to know is which multicast address corresponds to each channel.

Another computer network marketed by CobraNet uses a unicast protocol. Transmitters are given repeating time intervals to transmit packets and the receiver is configured to receive the packets during that particular time interval.

SUMMARY OF THE INVENTION

In first aspect, the invention provides a receiver device for receiving media packet streams from a data network, the receiver device comprising:

a data interface to receive media packet streams, each media packet stream containing one or more user selected media channels;
a processor to extract the user selected media channels from the received media packet streams; and
a controller to receive information on a user selection of media channels advertised on the data network, to receive information on the transmission source of each of the user selected media channels so as to group the user selected media channels that can be transmitted from the same transmission source, and to automatically provide instructions to the processor that one or more media packet streams are to be received for each group and the number of user selected media channels in each media packet stream.

In this way, the user is not required to manually configure the processor to receive media packet streams. Instead, the controller operates to receive information on a user selection of media channels and automatically configures the processor. Further, the receiver device is able to receive media channels using both unicast and multicast protocols using the invention. The invention has the advantage of being able to use low cost data network cabling and equipment, such as switched Ethernet, on which to receive the media packet streams.

The selected media channels each have a format and the controller may operate to receive information on the format of each of the selected media channels. The format of a media channel may include any one or more of sample rate, bit depth and encoding method. The controller may also group the selected media channels having the same format. This grouping on format may be on any one or more of sample rate, bit depth and encoding method. Alternatively, media channels having different media channel formats may be included within the one media packet stream. In this way the data network of the invention offers improved flexibility since the receiver device is able to receive heterogeneous media channels from the same data network.

Each packet of a media packet stream may contain more media channels than the selected media channels of a group.

The one or more media packet streams of a group may also contain media channels that are not selected media channels of that group. The controller may provide instructions to the processor that two or more packet streams are to be received for each group.

The controller may be remote from the processor and or data interface.

Information about the transmission source may include network parameters of the transmission source. The transmission source may be a transmitting device. The network parameters may include an IP address and configuration port identifier.

The controller may also receive for each selected media channel information on the methods in which the selected channel can be received. A method the selected media channel can be received may be within one or more pre-defined media packet streams that also contain other media channels. The pre-defined media packet stream may be received using the multicast protocol.

Receiving the selected media channel may use unicast protocol and on request to the transmission source. The controller may further operate to send to the transmission source a request to receive a media packet stream containing the one or more selected media channels of a group.

The controller may determine the preferred method of receiving the selected media channel. This may include determining whether the media channels in a pre-defined media packet stream includes other selected media channels, and favouring receiving the pre-defined media packet stream as the number of selected media channels within the pre-defined media packet stream increases. The controller may also receive a weighting factor for methods that the selected media channel can be received and favouring the method that has the weighting factor that indicates the preferred method.

The controller's instructions to the processor may include instructions to ignore one or more media channels within a media packet stream to be received.

The controller's instructions to the processor may include instructions on which output channels the extracted selected media channels should be routed to.

The controller's instructions to the processor may include instructions as to the destination address and port to use, or equivalent addressing information for non-Internet Protocol transports.

The receiver device may include two or more data interfaces and the controller's instructions to the processor may include information on which data interface a media packet stream will be received. The controller may further operate to send a request to the transmission source to receive a first media packet stream at a first data interface and a second media packet stream at the second data interface, wherein samples contained in the first and second media packet stream are the same.

The media channels may be advertised on the network as a unique name that describes in words the source of the media channel. The information the controller receives on the user selection of media channels may be an indication of the unique name of each user selected channel. The name may be comprised of one or more words that describe the source of the media channel and the one or more words that describe the transmission source that will transmit the media channel. This enables the user to easily browse and unambiguously identify the desired media channels.

The controller may send the advertised name of the media channel as a look-up-key to a database connected to the data network and to receive in reply the media channel format information from a database connected to the data network. The database may be a distributed database.

The receiver device may include a second data interface, and the controller may provide instructions to the processor that a copy of a media packet stream is to be received at the second data interface. Multiple second data interfaces may be provided. The user interface may be located remotely on the data network from the processor. This enables the user to configure all the receiver devices from the one location on the data network.

The controller may include storage means to store details of the groups and method by which the media channels of the groups are to be received. This includes information about the transmission source of the group and format of the media channels within the group.

The media channels may be audio signals, video signals, or instruction signals, such as lighting instruction signals.

The data network may be implemented over the Internet Protocol. The data network may be implemented with another packet-based transmission method. The network may be comprised of sub-networks each having different packet-based transmission methods.

A media packet stream may contain distinct or overlapping media channels having different bit depths, encodings and sample rates. A single media packet stream may use some or all of the space in a packet.

In a second aspect the invention provides receiving media packet streams from a data network, the method comprising the steps of:

receiving information on a user selection of media channels advertised on the data network;

receiving information on the transmission source of each of the user selected media channels so as to group the user selected media channels that can be transmitted from the same transmission source;

automatically providing instructions to the processor that one or more media packet streams are to be received for each group and the number of user selected media channels in each media packet stream;

receiving the one or more media packet streams; and extracting the user selected media channels from the received media packet streams.

In a third aspect the invention is an instruction message sent from the controller to a processor of a receiver device. In a fourth aspect the invention provides computer software to perform this method.

In another aspect, the invention provides a transmitter device for transmitting media packet streams on a data network, the transmitter device comprising:
  a plurality of input media channels to receive media channels, each media channel having a format;
  one or more transmission ports to transmit media packet streams;
  a processor to packetize received media channels to create media packet streams for transmission by the transmission port; and
  a controller to group received media channels having the same format or to receive instructions on which received media channels comprise a group; and to automatically provide instructions to the processor to packetize media channels of a group into the same media packet stream.

The controller may further operate to receive further instructions amending which received media channels comprise a group. In this way the groups can be dynamically amended over time.

The controller may further operate to provide further instructions to the processor that a media packet stream is to be sent from two transmission ports, such as two data interfaces—primary and redundant.

The controller may control the processor by sending to the processor an instruction message. The controller may further control the processor to address the media packet stream to an address and port. The address may be a multicast address or a unicast address (i.e. a specific address on the data network). The instruction message may include the information necessary to construct a packet. For example for IP packets the information may include any one or more of the destination address, destination port, number of channels in group and slot details of each media channel of the group. For other protocol types other information or addresses will be required.

The controller may be located remotely from the processor and/or the transmission ports on the data network. In this way the controlling of the packetizing of the media channels can be performed remotely on the data network, such as on a separate computer connected to the data network.

If the format of a media channel changes, the controller further operates to automatically re-group the media channels into groups having the same format.

In a further aspect, the invention a method for transmitting media packet streams on a data network, the method comprising the steps of:

receiving media channels at a plurality of input media channels, each media channel having a format;

grouping one or more received media channels having the same format or grouping one or more media channels according to instructions received on which media channels comprise a group;

automatically providing instructions to a processor to packetize media channels of a group into the same media packet stream; and transmitting the media packet streams.

In another aspect, the invention is an instruction message sent from a controller to a processor of a transmitter device. In yet a further aspect, the invention is a software program to perform the method described above.

In yet a further aspect, the invention comprises an instruction message sent from a controller of a receiver device to a controller of a transmitter device, the transmitter device operable to dynamically configure media packet streams.

In another aspect, the invention comprises a computer system comprised of a transmitter device and receiver device described above.

In yet another aspect, the invention provides a transmitter device for transmitting media packet streams on a data network, the transmitter device comprising:

a plurality of input media channels to receive media channels, each media channel having a format;

one or more transmission ports to transmit media packet streams;

a processor to packetize received media channels to create media packet streams for transmission by the transmission port; and a controller to control the processor to create a first media packet stream containing one or more media channels having the same format, and to create a second media packet stream containing one or more media channels having the same format, wherein the format of the media channels of the first media packet stream is different to the format of the media channels of the second media packet stream.

The controller may also automatically determine the number of frames per packet of each packet stream, wherein the number of frames per packet of the first packet stream is different to the number of frames per packet of the second packet stream. Each frame of a packet includes one sample of each media channel. The number of frames per packet may be determined based on the sample rate and bit depth of the media channels within that group.

The controller may also further control the processor to cause the first media packet stream to be sent to a multicast address, and the second media packet stream may be sent to a unicast address.

In yet a further aspect the invention provides a method for transmitting media packet streams on a data network, the transmitter device comprising:

receiving media channels at a plurality of input media channels, each media channel having a format;

controlling a processor to create a first media packet stream containing one or more media channels having the same format, and to create a second media packet stream containing one or more media channels having the same format, wherein the format of the media channels of the first media packet stream is different to the format of the media channels of the second media packet stream; and transmitting the created media packet streams.

The invention further provides computer software for transmitting a first and second media packet stream as described above.

In another aspect, the invention provides a receiver device for receiving media packet streams from a data network, the receiver device comprising:

a data interface to receive a first media packet stream and a second media packet stream, wherein each packet of the first and second media packet streams contain one or more media channels;

a processor to extract the media channels from the first and second media packet streams; and a controller to receive information on the format of the media channels contained within the first and second media packet streams, wherein the format of the media channels contained within the first media packet stream is different to the format of the media channels contained within the second media packet stream; and to provide instructions to the processor on how to de-packetize the first and second media packet steams according to the different media channel formats.

In yet a further aspect the invention provides a method for receiving media packet streams from a data network, the method comprising the steps of:

receiving a first media packet stream and a second media packet stream, wherein each packet of the first and second media packet streams contain one or more media channels;

receiving information on the format of the media channels contained within the first and second media packet streams, wherein the format of the media channels contained within the first media packet stream is different to the format of the media channels contained within the second media packet stream; and providing instructions to a processor on how to de-packetize the first and second media packet steams according to the different media channel formats to cause the processor to extract the media channels from the first and second media packet streams.

The invention further provides computer software for receiving a first and second media packet stream as described above.

In a further aspect, the invention provides a computer network for transmitting and receiving media packet streams, comprised of transmitting and receiving devices as described above.

BRIEF DESCRIPTION OF THE DRAWINGS

Examples of the invention will now be described with reference to the accompanying drawings in which:

FIG. 4(a) is an example display of a user interface;

BEST MODE OF THE INVENTION

Overview of the Components of the Network

Figure 1:
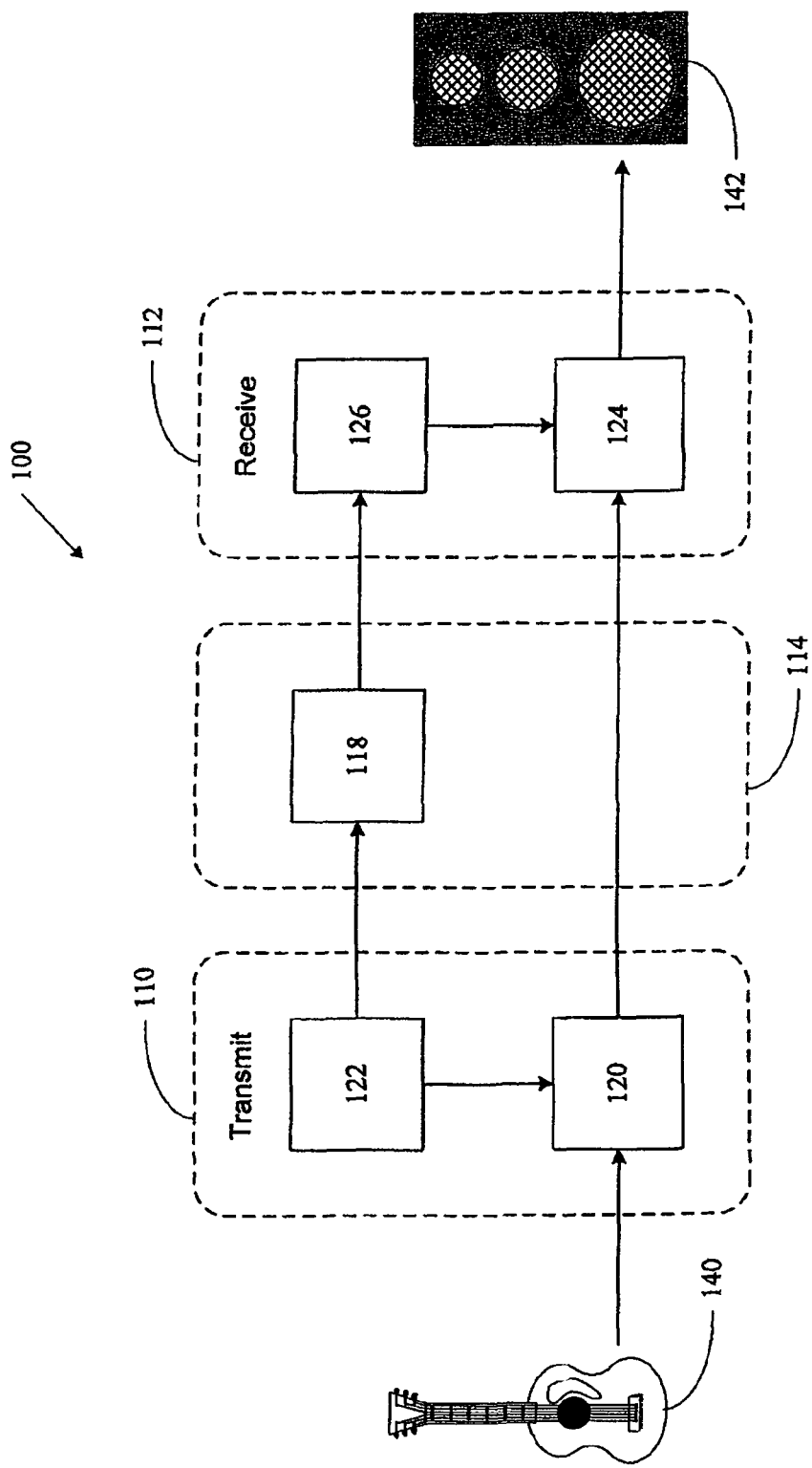
FIG. 1 is a schematic diagram of a network that can be used with the invention.

Referring first to FIG. 1, a data network 100 comprises a transmitter device 110 and a receiver device 112. There may be a plurality of transmitter devices 110 and receiver devices 112 on the network 100, but only one of each is discussed here for clarity. Further, the devices 110 and 112 may be able to perform both transmitting and receiving functions, but they are described here as only performing one function each again for better clarity.

The transmitter device 110 and the receiver device 112 are connected to each other by a network 114 so that they are able to send and receive digital media packets. The transmitter device 110 is comprised of an Audio Processing Engine (APE) 120 and an Audio Processing Engine Controller (APEC) 122. The receiver device 112 is also comprised of an APE 124 and an APEC 126. The media packets are sent in media packet streams that can contain two or more media channels. For simplicity, the embodiments describe all media channels in a media packet stream to be the same format however the invention can accommodate for multiple media channel formats within the one media packet stream.

A media device 140, such as a guitar, is connected to the APE 120 and the APE 120 receives the media signals generated by the media device 140. A preprocessor (not shown) may be added to convert the media channel from analogue to digital or convert from one digital format to another (e.g. sample rate or bit depth conversion). The APE 120 then packetizes the digital media channel. The resulting packet stream is sent using the network 114 to the APE 124 of the receiver device 112. The APE 124 then de-packetizes the digital media signal, (if suitable) converts it to analogue and transmits the analogue media signal to the media device 142, such as a speaker for playout. Conversion will not be necessary when the media signals are non-analogue sources, such as a MIDI sources. The rate and offset of packetization and transmission is tightly controlled in time to ensure that the playout of the media signal by the media device 142 is synchronized with the playout of the media signals by another media device (not shown) connected to the network 114 that also received the media signal from the APE 120. The packetization operation of the APEs 120 and 124 is described in detail in the co-pending PCT application PCT/AU2006/000538 (WO 2006/110960).

An APEC 122/126 is a component implemented in software or hardware. In this network 100, the APEC 122/126 is on the same physical device as the APE 120/124, but alternatively may be located remotely from the APE 120/124 such as on another device or a central computer connected to the network 114. An APEC 122/126 provides the user with an abstract view of the APEs 120/124 and any audio devices 140 and 142 connected to them. A transmitter device 110 has a number of transmittable channels that can be named and then made available to receiver devices 112 on the network 114; this is called advertisement. A receiving device 112 has a number of receiving channels. A named transmitting channel can be assigned to a receiving channel; this is called subscription. APECs 122 and 126 will configure the APEs 120/124 to cause the media signals to be routed from the transmitting channel to the receiving channel.

The receiving and transmitting APECs 126 and 122 exchange configuration information and control messages over the network 114. Configuration information is exchanged via a service discovery database 118, such as DNS-SD. This database may be implemented in a distributed manner with each device 110 and 112 storing and providing the configuration information associated with its APEC 122/126. Additional control messages are sometimes required to complete the subscription process and cause media signals to be routed. These are sent between the receiving APEC 126 and the transmitting APEC 122.

Each APEC 122/126 configures its own APE 120/124 and interacts with other APECs 122/126 to ensure that configurations match between communicating APEs 120/124.

Inside each device 110 and 112, input channels such as the channel from audio device 140 are known as "TX channels" because they will be transmitted over the network, and output channels such as the channel that is sent to audio device 142 are known as "RX channels" because they will receive data from the network.

Unicast Example

Figure 2:
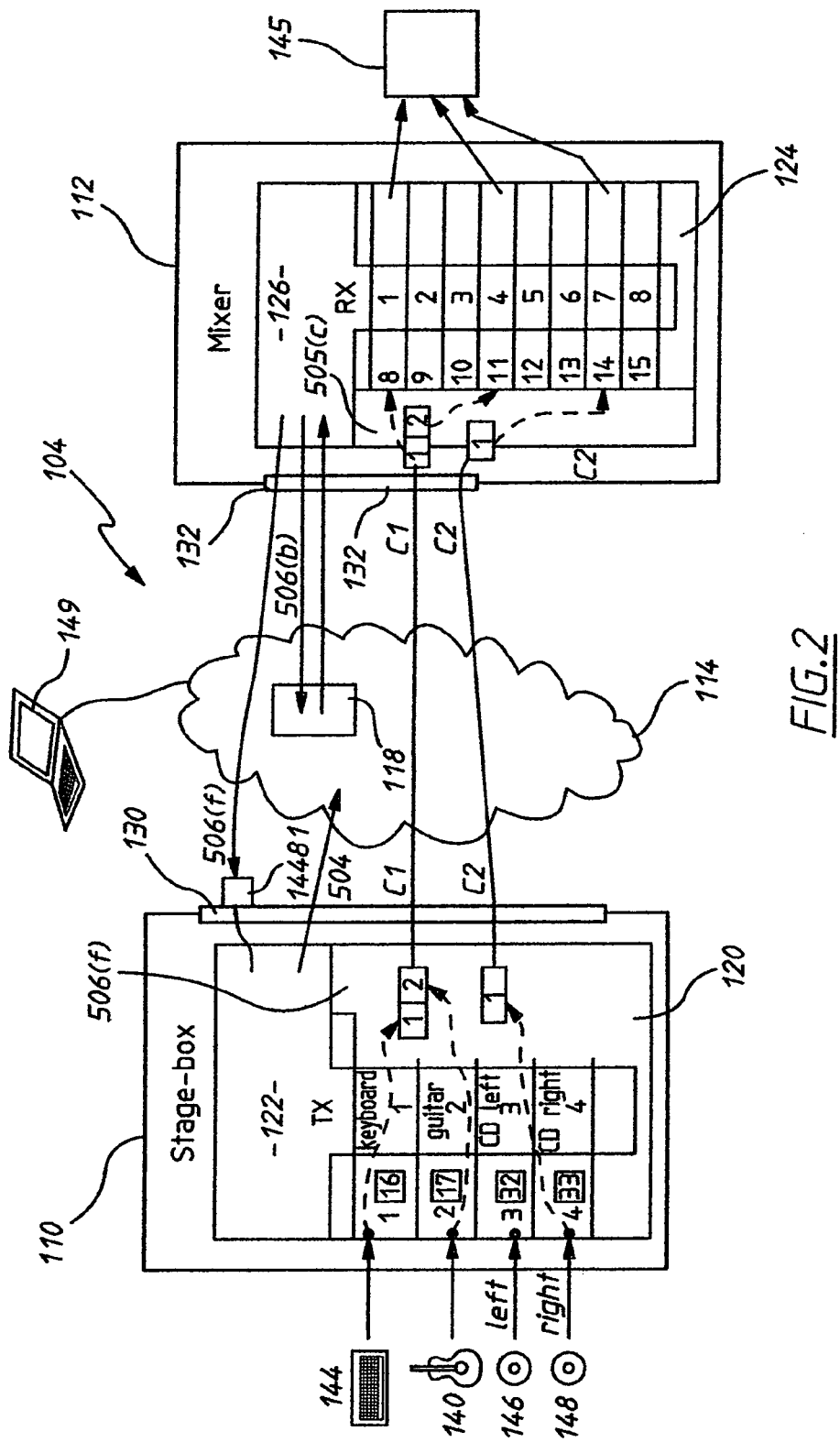
FIG. 2 a schematic diagram of a network using a unicast protocol in accordance with a first embodiment of the invention.
Figure 3:
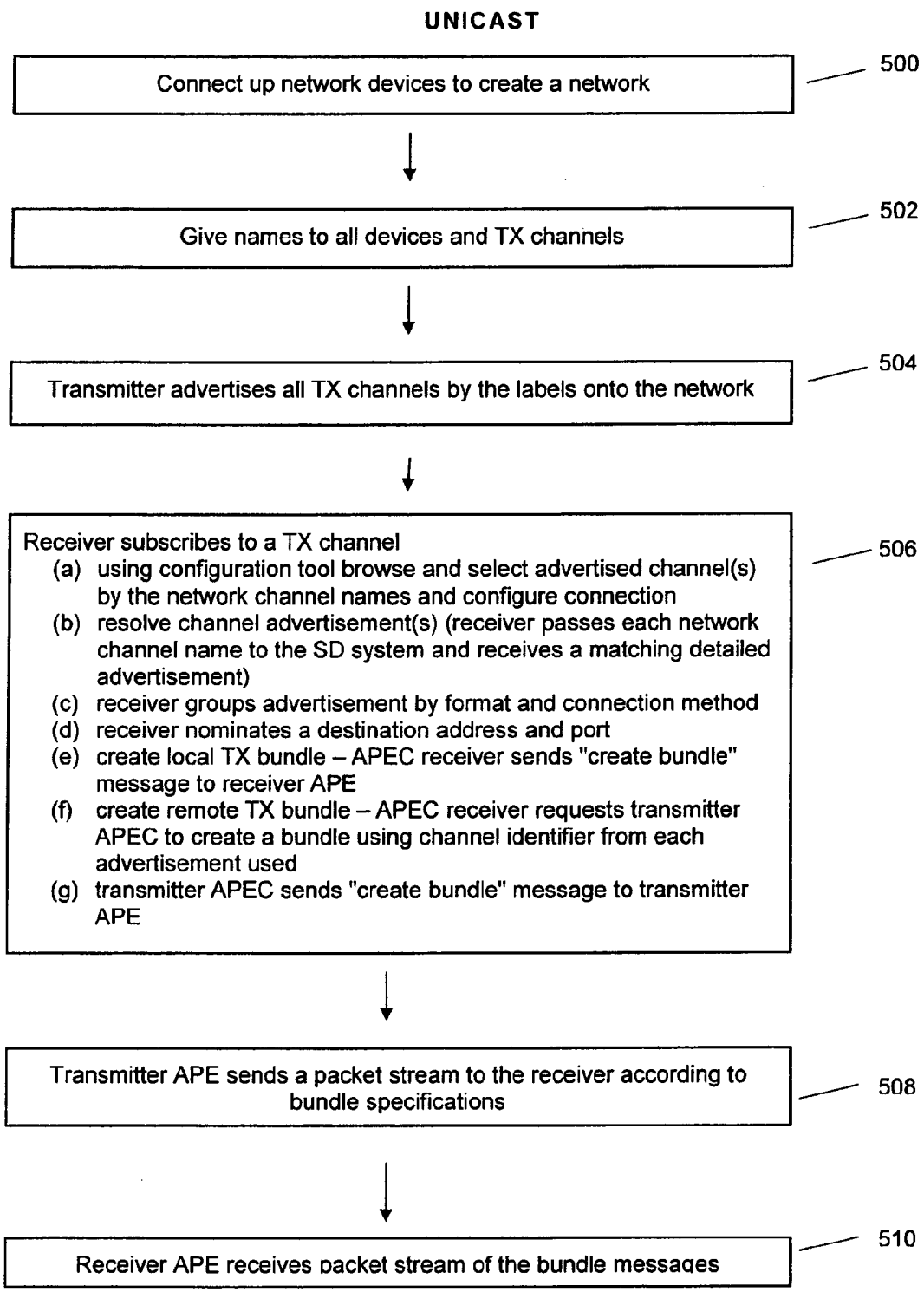
FIG. 3 is a flow diagram of the method of the embodiment shown in FIG. 2.

In reference to FIGS. 2 & 3, the operation of the computer network of FIG. 1 in accordance with one embodiment of the invention will now be described. The same reference numbers have been used in FIGS. 1 and 2 to represent the same components of the network. In this embodiment the computer network 104 operates using a unicast protocol.

Connect Up Network

Initially, the devices must be connected 500 to create the network 104. In this case four media devices, a keyboard 144, a guitar 140, a left channel for a CD 146 and a right channel for a CD 148, are connected to the four input channels of the transmitter device 110. The four physical channel inputs are labelled channels 1 to 4 respectively. In this example the keyboard and guitar use the same sample rate and sample format (say 48 kHz, 24 bit, PCM encoded). The CD channels have a different sample rate and sample format (say 44.1 kHz, 16 bit, PCM encoded). The output channels of the mixer 112 are connected to a mixing console 145.

Both devices 110 and 112 use some mechanism to configure addresses on their network interface. One such mechanism is zeroconf link-local addressing. Each device 110 and 112 randomly picks an address from a specific range and then checks the network 114 to see if anyone else is using the same address by using the address resolution protocol (ARP) to query who owns that address. If no device responds then the address is considered unused and it is safe for the device 110 or 112 to claim it for its own use. In this example the transmitter 110 interface 130 has address 169.254.10.11 and the receiver device's 112 interface 132 has address 169.254.28.12. In this example each device 110/112 has a single interface that is shared between their APEC 122/126 and APE 120/124 for primary data and for configuration, although they could be separate. In this example there are no redundant interfaces (redundant interfaces discussed further below).

Assign Names

Next, each device and channel is given names 502 as appropriate. As with all configurations, names are stored in the APECs 122 and 126. Each APEC 122 is initialized with a default name. One method of choosing a unique default name is a short description such as manufacturer and product name followed by the device's serial number. Users may use a user interface 149 to change the name stored on the APEC 122 and 126. In this example, the interface 149 is provided by a PC that is connected to the network 114 and is presented to the user on the screen of the PC. Channels are variously identified as numbers starting from 1, and arbitrary numbers defined by the APE 120. This step involves giving descriptive textual names to channels and devices as required, for example input/TX channels are the only channels given textual names.

The transmitter device 110 is named "stage-box". The four input channels are also named. The name "keyboard" is given for the input channel 1 connected to the keyboard 144. The name "guitar" is given for the input channel 2 connected to the guitar 140. The name "CD-left" is given for the input channel 3 connected to the left channel for the CD 146. The name "CD-right" is given for the input channel 4 connected to the right channel for the CD 148.

The receiving device 112 is named "mixer". The receiver device 112 has eight output channels numbered 1 to 8. Since they are output channels they are not referenced in any exchange of messages between the APECs 122 and 126 they are not given any names for advertisement. For the purpose of this example, the receiving device 112 does not have any input channels connected to a media device.

The APEC 122 presents its TX channels to the user interface 149 as a single contiguous array, starting from 1. Each presented TX channel also has presented an associated name. The names are used during advertisement and subscription as described below. In this way, the user's configuration interactions are based on the textual names of the channels and devices. This makes configuration from the user's perspective more user friendly. The APEC 126 presents its RX channels to the user interface 149 as a single contiguous array, starting from 1 to 8.

The APEs 120 and 124 give each of their physical channels an arbitrary identifier. It is the job of the APEC 122 and 126 to map these physical identifiers to the other representations such as the arrays of channels and names for TX channels. APEs 120 and 124 guarantees that the number and identifiers of its physical channels are fixed for a given run, but the (constant) identifiers may occur anywhere in the given space. It is possible to reconfigure the hardware offline and the APEC will accommodate the new configuration when it is restarted.

Assume that stage-box's APE 120 identifies its four input channels as 16, 17, 32 and 33. Stage-box's APEC 122 represents these identifiers as input channels 1-4 and associates the appropriate names. Mixer's APE 124 has eight output channels numbered 8-15. Mixer's APEC 126 represents these as output channels 1-8.

Further, the APEC 122 can support TX channel aliases. This means that the same physical channel is represented as two different channels with different names by the APEC 122. For example, stage-box's 110 physical channel ID 16 might be both channel 1 named "keyboard" and channel 5 (not shown) named "lead melody". Aliases can be added or deleted by the APEC 122. Aliases are added to the end of the otherwise fixed array of input channels.

As part of unicast advertisement, each APEC 122 and 126 needs a unique identifier to refer to a channel. Normal practice is to simply use the APE's channel ID.

This unicast example uses dynamic bundle configuration. Dynamic bundle configuration means that no bundles (and thus packets) are created until a receiver 112 asks for them by way of subscription (as described below). APEC 122 does not initially configure any bundles on the APE 120. Dynamic bundle creation requires a configuration port on the transmitter 110. This port accepts bundle creation requests from the receiver 112. In this example, stage-box 110 has set up UDP/IP port 14481 as its configuration port. The address is stage-box's address: 169.254.10.11.

Unicast Channel Advertisement

The next step is the advertisement 504 of the TX channels by stage-box 110 onto the network 114. When a TX channel is advertised by a transmitter 110, other receiver devices 112 see it as a "network channel".

Stage-box 110 creates a channel advertisement for each active TX channel. Each channel has a network name formed by concatenating the channel's name with the device's name, for example "keyboard@stage-box". Since "stage-box" is unique on the network 104 and "keyboard" is unique on stage-box 110, this network name is guaranteed to be unique on the network 104.

The channel advertisement has four parts as shown here for keyboard:
  Channel network name: keyboard@stage-box. This is used as a search key by service discovery 118.
  Channel format. In this case 48 kHz, 24 bit, PCM encoded.
  Dynamic bundle configuration information. In this case, the configuration port is stage-box.local:14481. "stage-box.local" is the unique name that identifies the address of stage-box's configuration interface 130. It resolves via DNS to 169.254.10.11. Stage-box 110 can handle up to four channels per dynamic bundle.
  Existing static (multicast) bundles containing this channel. In this example, there are no static bundles.

Subscribing

Next, the mixer 112 subscribes 506 to the network channels advertised by the stage-box 110. Subscription occurs when a receiver 112 associates a (remote) network channel with a (local) RX channel.

A user configuration tool such as the interface 149 can browse the available network channel advertisements 506(*a*) and use these names to configure subscriptions on the receiver. In this example, the mixer 112 has been configured so that RX channel 1 is subscribed to keyboard@stage-box, RX channel 4 is subscribed to guitar@stage-box, and RX channel 7 is subscribed to CD-right@stage-box. Notice that the RX channel numbers (on the receiver 110) and the TX channel numbers (on the transmitter 112) are independent. The following table summarizes the mixer's 112 channel configurations:

| RX Channel | Subscribed to . . . |
|---|---|
| 1 | keyboard@stage-box |
| 2 | — |
| 3 | — |
| 4 | guitar@stage-box |
| 5 | |
| 6 | — |
| 7 | CD-right@stage-box |
| 8 | — |

Figure 4A:
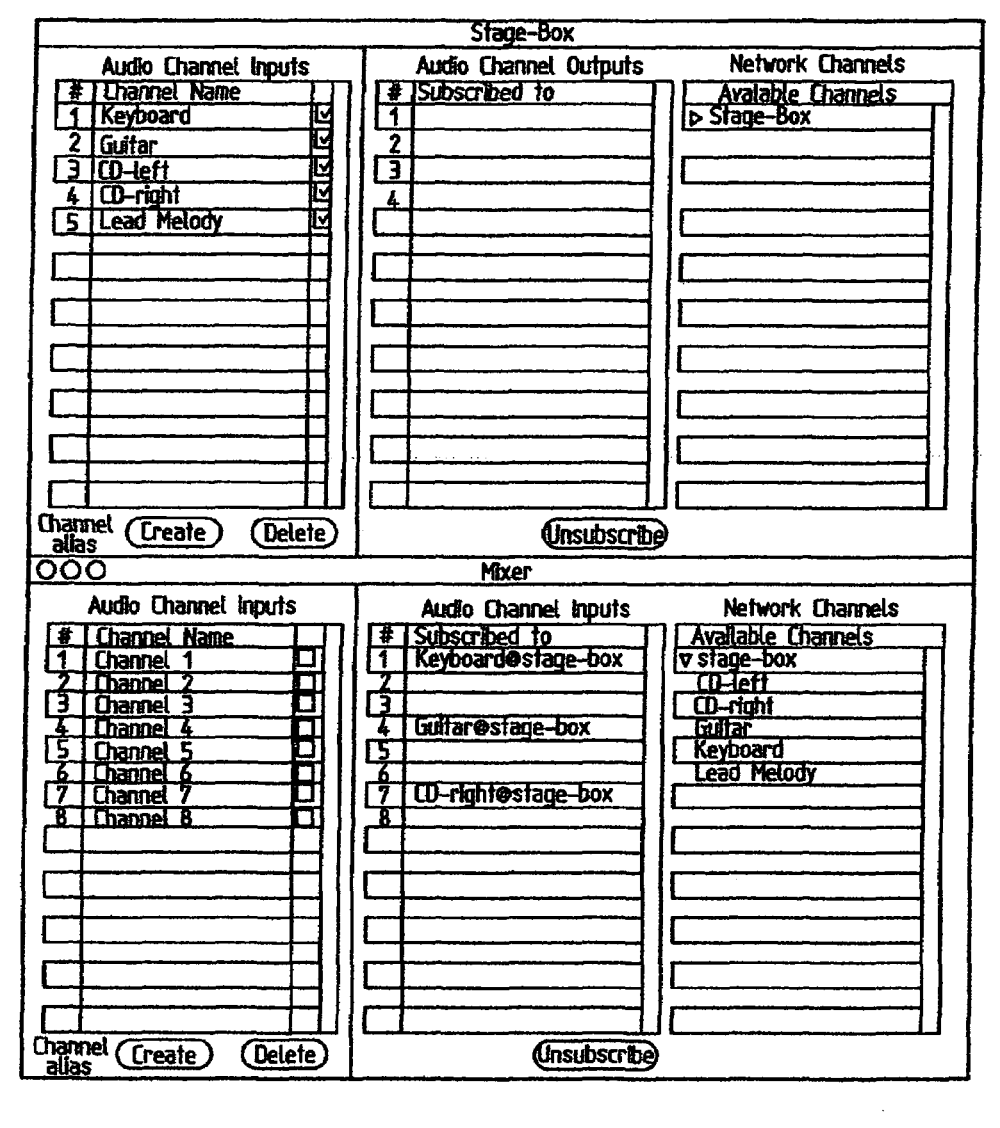

FIG. 4(*a*) shows how this can be displayed to the user on the user interface 149.

The receiver 112 now needs to connect the subscribed channels and thus complete subscription. The first stage of this process is resolving each network channel name which is used as a key in service discovery 118, which may be a database that is accessible devices on the network 114. The database stores for each network channel name the corresponding detailed advertisement. The receiver 112 passes 506(*b*) each network channel name to the service discovery system 118 and receives back the matching detailed advertisement (if it exists).

Using DNS-SD as the service discovery protocol, a network channel's advertisement would be received as follows in the example of keyboard@stage-box:

Record: keyboard@stage-box._netaudio_chan._udp.local SRV
   0014481 stage-box.local
Record: keyboard@stage-box._netaudio_chan._udp.local TXT
   txtvers=2
   rate=48000
   bits=24
   enc=1
   nchan=4
   id=16

"keyboardstage-box._netaudio_chan._udp.local" is the full name of the key for the channel advertisement. The SRV record is the primary record for the channel. It includes the address and IP port of the dynamic bundle configuration port. The TXT record contains detailed information, including the sample rate, bit depth and encoding (1=PCM). The "txtvers" field is a version number for the TXT record. The "nchan" field is the maximum number of channels per dynamic bundle. Stage-box 110 has a maximum of four channels per dynamic bundle, enough to send all inputs in a single packet. The id field is an arbitrary physical channel identifier used by the APE 120 to tersely identify its channels. The channel named "keyboard" happens to have ID 16. Outside the transmitting APEC 120, this ID is only useful to a receiver APEC 124 configuring a dynamic bundle on APEC 122.

In this example, mixer 112 will ask the service discovery for three keys: keyboard@stage-box, guitar@stage-box and CD-right@stage-box. It will receive three detailed advertisements back from the service discovery system 118, one for keyboard@stage-box, one for guitar@stage-box and one for CD-right@stage-box. The mixer's 112 APEC 126 now groups 505(c) these advertisements by channel format and connection method. Since channels guitar and keyboard have the same channel format and the same dynamic creation port, the APEC 126 creates one group for the two channels (c1). A separate group is created for CD-right@stage-box since it has a sample rate that is different to keyboard@stage-box and guitar@stage-box (c2).

Because the unicast protocol used in this example is based on dynamic creation, the receiver 112 needs to nominate 505(d) a destination address and port. The destination address will be the address mixer's 112 own interface 132 (169.254.28.12), since that interface is used for primary data. In some cases, the APEC 126 may choose its own destination port but in this example the APEC 126 does not, so the APEC 126 chooses to use port 26528 for group c1 and 26719 for group c2.

Figure 4B:
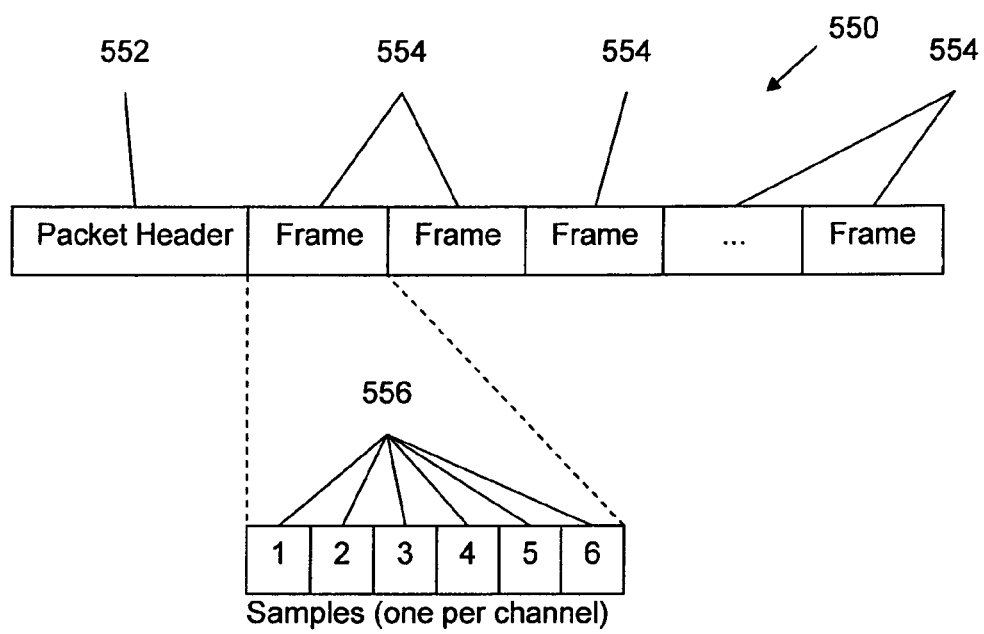
FIG. 4(b) is a schematic diagram of single packet of a packet stream sent on the network using the invention.

Mixer 112 must now create pairs of bundles for each group: an RX bundle on its own APE 124 and a matching TX bundle on stage-box 110 for each group. As shown in FIG. 4(b), as part of creating a group each channel must be assigned a sample space 556 in each frame 554 of the packet 550. This is called a slot. Each packet 550 has one slot per channel and thus one sample space 556 per frame 554. Bundle of group c1 has the following specification:
   a Destination: 169.254.28.12:26528
   Channel format: 48 kHz, 24 bit, PCM
   Slots: 2
Bundle of group c2 will have the following specification:
   Destination: 169.254.28.12:26719
   Channel format: 44.1 kHz, 16 bit, PCM
   Slots: 1

The channel maps will be different on each device 110 and 112. For group c1, on stage-box 110, input channel 1 keyboard) will map to slot 1 and input channel 2 (guitar) will map to slot 2. On mixer 112, slot 1 (keyboard from stage-box) will map to output channel 1 and slot 2 (guitar from stage-box) will map to output channel 4.

For group c2, on stage-box 110, input channel 4 (CD-right) will map to slot 1. On mixer 112, slot 1 (CD-Right from stage-box) will map to output channel 7.

Create Local RX Bundles

Locally, mixer 112 sends 506(e) 'create RX bundle' message from its APEC 126 to its APE 124 for each group. For group c1:

| Field | Value | Notes |
| --- | --- | --- |
| Destination address | 169.254.28.12 | Mixer's primary data interface address |
| Destination port | 26528 | |
| Interface | 0 | Primary data interface is #0 |
| Number of slots | 2 | |
| Map for slot 1 | [8] | Array with one element: RX channel 1 |
| Map for slot 2 | [11] | Array with one element: RX channel 4 |

For group c2:

| Field | Value | Notes |
| --- | --- | --- |
| Destination address | 169.254.28.12 | Mixer's primary data interface address |
| Destination port | 26719 | |
| Interface | 0 | Primary data interface is #0 |
| Number of slots | 1 | |
| Map for slot 1 | [14] | Array with one element: RX channel 7 |

Notice that the channel identifiers passed in value maps are those used by the APE 124. On mixer 112, RX channel 1 corresponds to APE 124 RX channel 8, RX channel 4 to APE 124 RX channel 11 and RX channel 7 to APE 124 channel 14.

The channel maps are actually arrays implemented as bit fields, not a single value. It is meaningful for example to route slot 2 to both RX channel 4 and RX channel 5, duplicating slot 2 at the receiver 112. In this case, the second channel map would be [11,12].

The channel format is implicit in the channels passed in the channel map. In this example, all channels in the map must have the same format. It is an error to pass channels with different channel formats in a single bundle creation message.

Create Remote TX Bundle

Mixer 112 cannot create a bundle on stage-box's APE 120 directly. Instead, it asks 506(f) stage-box's APEC 122 to create a bundle on mixer's 112 behalf for each group.

Mixer's APEC 126 sends a message to stage-box's APEC 122 via the advertised configuration port 14481 for each group. The message fields are quite similar to the fields used when configuring the APE 124. The main difference is that the fields in the channel map are not arrays. Instead, the channel identifier (which is the APE's 120 identifier) from each advertisement is used. For group c1 the message from the mixer 112 to the stage-box 110 would be:

| Field | Value | Notes |
| --- | --- | --- |
| Destination address | 169.254.28.12 | Mixer's primary data interface address |
| Destination port | 26528 | |
| Interface | 0 | Primary data interface is #0 |

| Field | Value | Notes |
| --- | --- | --- |
| Number of channels | 2 | |
| Slot 1 | 16 | ID of keyboard@stage-box |
| Slot 2 | 17 | ID of guitar@stage-box |

For group c2 the message from the mixer 112 to the stage-box 110 would be:

| Field | Value | Notes |
| --- | --- | --- |
| Destination address | 169.254.28.12 | Mixer's primary data interface address |
| Destination port | 26719 | |
| Interface | 0 | Primary data interface is #0 |
| Number of channels | 1 | |
| Slot 1 | 33 | ID of CD-right@stage-box |

On stage-box 110, the APEC 122 converts the message from the mixer 112 for group c1 into a message to create 505(*g*) the specified bundle on stage box's APE 120.

| Field | Value | Notes |
| --- | --- | --- |
| Destination address | 169.254.28.12 | Mixer's primary data interface address |
| Destination port | 26528 | |
| Interface | 0 | Primary data interface is #0 |
| Number of channels | 2 | |
| TX Channel for slot 1 | 16 | TX Channel 1 |
| TX Channel for slot 2 | 17 | TX Channel 2 |

The message for group c2 to create 505(*g*) the specified bundle on stage box's APE 120 would be:

| Field | Value | Notes |
| --- | --- | --- |
| Destination address | 169.254.28.12 | Mixer's primary data interface address |
| Destination port | 26719 | |
| Interface | 0 | Primary data interface is #0 |
| Number of channels | 1 | |
| TX Channel for slot 1 | 33 | TX Channel 3 |

Unlike the RX bundle configuration message, only a single channel can map to a given slot. Once the TX bundles are created on stage-box 110, stage-box 110 will begin sending packet streams to the mixer 122.

Sending Bundle

Now, that the stage-box 110 and mixer 112 are configured to send and receive the bundles, the sending 508 of the packet streams can now begin. A bundle specifies a stream of packets that is sent from the transmitter 110 to the receiver 112. Unlike the configuration and service discovery messages described above, the packet stream is high priority data and very time sensitive. In contrast, it is not uncommon for service discovery changes to take a couple of seconds to propagate.

Referring to FIG. 4(*b*), each packet 550 in the stream has a header 552 followed by one or more frames 554. Each frame 554 contains one sample 556 from each channel in the stream. The number of frames 554 per packet 550 is not fixed and can be tuned by the APEC 122. That is, the size of a frame 554 is dictated by the number of channels included in the bundle and the size (bit depth) of each channel. Then depending on the size of the frames a suitable number of frames 554 per packet 550 is chosen. Increasing the number of frames 554 per packet 550 increases latency but improves network efficiency. Increasing the number of channels per frame improves network efficiency as long as the receiver needs all those channels.

Each packet header 552 contains a standard Ethernet header, a standard IP header and a standard UDP header in addition to the packet data. The packet data contains the audio routing header followed by the frames 554.

Audio Routing Header

The audio routing header is 9 bytes long and contains the following fields:

| Field | Size | Notes |
| --- | --- | --- |
| Version | 1 byte | |
| Timestamp (seconds) | 4 bytes | Number of seconds since 1 Jan. 1970 |
| Timestamp (samples) | 4 bytes | Number of samples since seconds value |

The timestamp is the sampling time of the first frame of samples (all samples in a frame have the same timestamp). Each successive frame has a timestamp 1 sample after the timestamp of the previous frame.

Because the fractional component is given as samples (rather than milliseconds or nanoseconds), it is impossible to reconstruct the actual timestamp without knowing the sample rate of the samples. This information is provided out-of-band via the service discovery mechanism 118. In this example, the sampling rate is 48 kHz.

No size field is included in the audio routing packet header. This information is available from the upper level headers, which are always UDP/IP.

Frames

Each frame 554 of samples 556 contains a fixed number of samples 556 with homogeneous format (24-bit PCM). In this example, each frame would be 6 bytes long. The first 3 bytes are slot 1 and the second 3 bytes are slot 2. According to the c1 TX bundle specification on stage-box, slot 1 contains samples from keyboard (channel 1, APE channel 16) while slot 2 contains samples from guitar (channel 2, APE channel 17).

If each packet were 10 frames in length then there would be 60 bytes of frames plus 9 bytes of header for a total UDP/IP data length of 69 bytes. The sample timestamps would differ by 10 samples (208.33 microseconds at 48 kHz) between each pair of packets.

UDP/IP

The UDP/IP destination for each packet is 169.254.28.12 port 26528, as specified by the TX bundle. Packets are sent at the second highest priority level; lower than clock packets but higher than any other data.

Multicast Example

Figure 5:
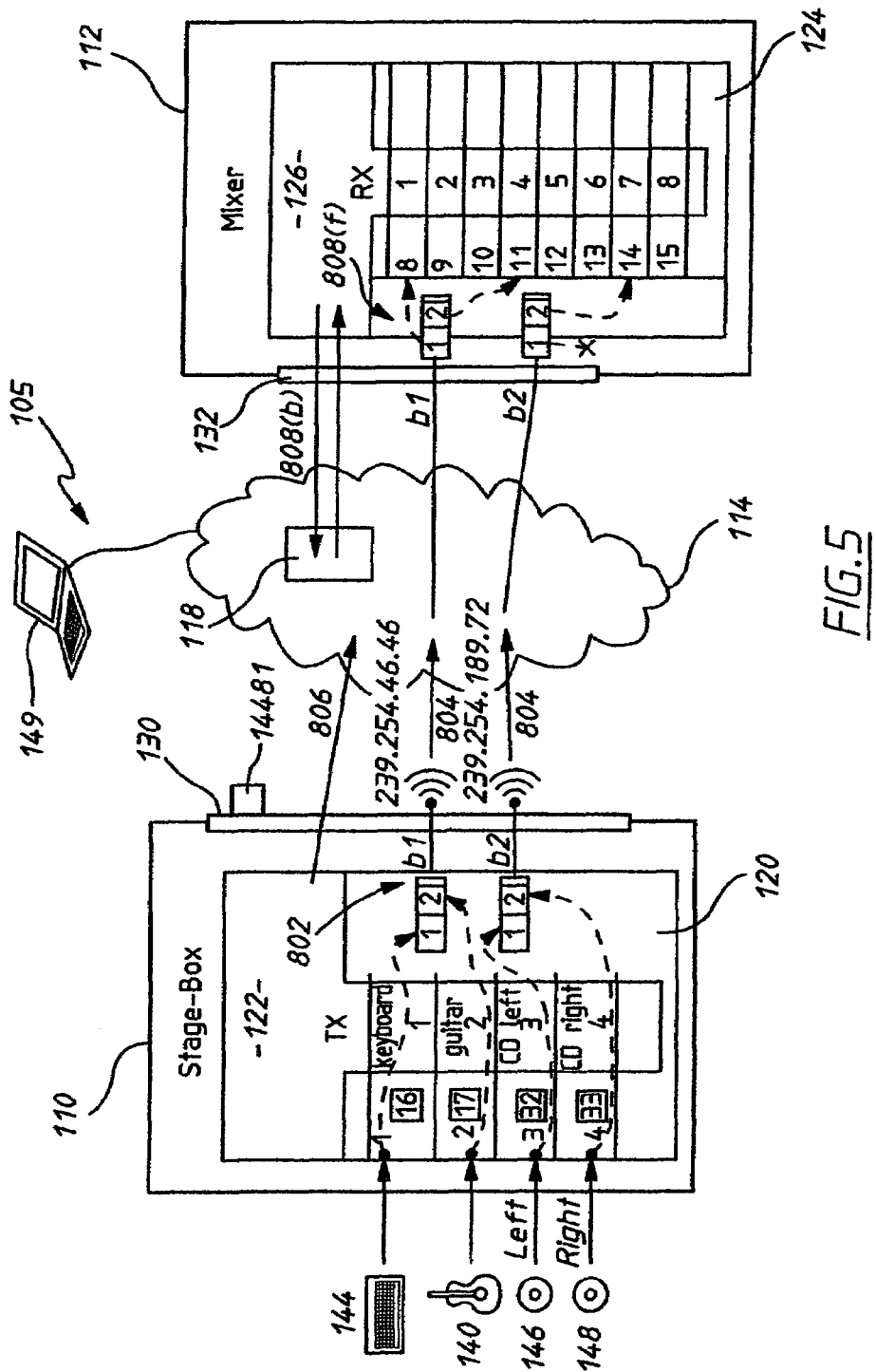
FIG. 5 is a schematic diagram of a network using a multicast protocol in accordance with a second embodiment of the invention.
Figure 6:
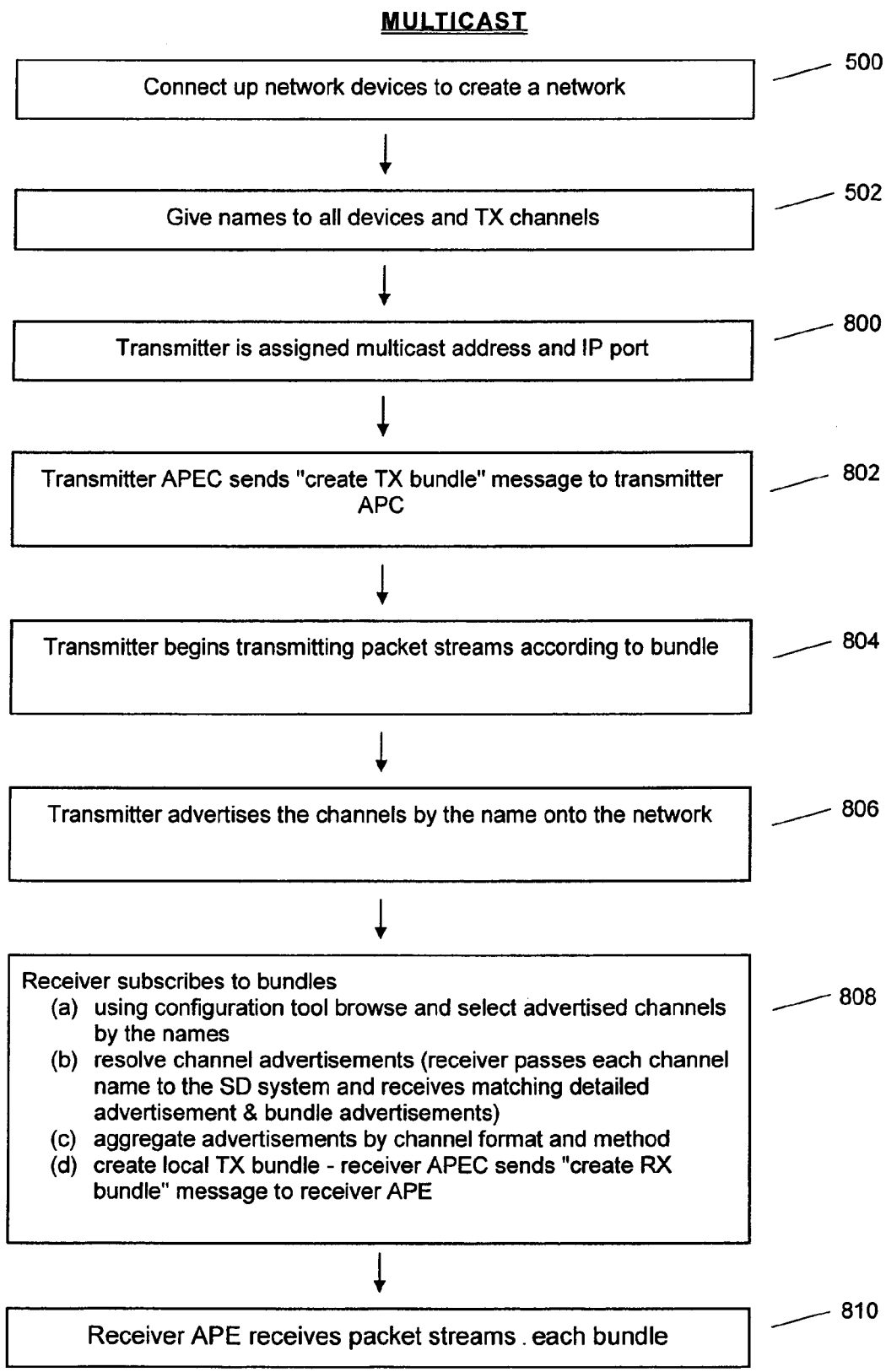
FIG. 6 is a flow diagram of the method of the embodiment shown in FIG. 5.

In reference to FIGS. 5 & 6, the operation of the computer network of FIG. 1 in accordance with a further embodiment of the invention will now be described. Same reference numbers have been used in FIGS. 1 and 5 to represent the same components of the network. In this embodiment the computer network 105 operates using a multicast protocol.

Unlike unicast, multicast generally requires the transmitter 110 to pre-configure bundles and packet streams. The receiver 112 then extracts the relevant channels. Unlike unicast, multicast receivers 112 do not need to directly communicate with multicast transmitters 110.

Initially, the connection 500 and naming 502 steps are repeated as described in the above unicast embodiment.

Create Bundle

When using unicast, channels are advertised even though they are being transmitted, and bundles are created dynamically. When using multicast, bundles are created statically and they are only advertised when they are being transmitted. In this example, stage-box 110 will transmit all channels. Like the unicast example (FIG. 2) the keyboard 144 and guitar 140 use the same sample rate and sample format (say 48 kHz, 24 bit, PCM encoded). The CD channels 146 and 148 have a different sample rate and sample format (say 44.1 kHz, 16 bit, PCM encoded). To send all these channels the APEC 122 configures two multicast bundles, being one bundle for each sample rate, bit depth and encoding method. The first bundle (b1) will contain the two channels keyboard 144 and guitar 140, and the second bundle (b2) will contain the two channels CD-left 146 and CD-right 148.

Choose Multicast Address and IP Port

Before the bundle can be created, a multicast destination address needs to be assigned 800. The namespace 239.254/16 is reserved for link local multicast addresses. A mechanism is used to choose a suitable unique address. One such mechanism is to use the dynamic DNS database to register a record containing a randomly generated multicast address. If another device has already registered that address then a new address is chosen. This process is repeated until an unregistered address is found. Registering this address claims ownership of the address. Here, the address 239.254.46.46 is chosen for the first bundle and 239.254.189.72 is chosen for the second bundle. An IP port is also required and the APEC 122 chooses 29061 and 29064.

Configure Bundle

Locally, stage-box 110 sends 802 the following two 'create TJX bundle' messages from its APEC 122 to its APE 120:

| Field | Value | Notes |
| --- | --- | --- |
| Destination address | 239.254.46.46 | Multicast destination address |
| Destination port | 29061 | |
| Interface | 0 | Primary data interface is #0 |
| Number of channels | 2 | |
| TX Channel for slot 1 | 16 | Keyboard |
| TX Channel for slot 2 | 17 | Guitar |
| Destination address | 239.254.189.72 | Multicast destination address |
| Destination port | 29064 | |
| Interface | 0 | Primary data interface is #0 |
| Number of channels | 2 | |
| TX Channel for slot 1 | 32 | CD-left |
| TX Channel for slot 2 | 33 | CD-right |

Now that the bundles are created packet streams for each bundle begin transmitting 804. Any receiver capable of receiving multicast can enable reception of address 239.254.46.46 or 239.254.189.72 and receive the appropriate stream. Some network switches can filter multicast traffic so that it is only delivered to devices that are interested (i.e. not full broadcast).

Packet Format

For example, each frame in a packet of bundle b1 will have two samples or 6 bytes of audio data. At 10 frames per packet, this will be 60 bytes of data. Adding a nine byte header results in a 69 byte UDP/IP payload.

Multicast Channel Advertisement

The basic structure of a multicast channel advertisement is the same as for a unicast channel advertisement 806. Rather than populate the dynamic bundle configuration information, the static bundle information is populated.

Since a given channel may be a member of several static bundles, the details of each static bundle are stored in a separate service discovery record in 118; the bundle name is the key for this record. A static bundle's service discovery record does not describe the individual channels; this information must be obtained from the channel advertisements.

A channel advertisement for a channel contained in a static bundle refers to the bundle name and the slot value is the slot in the static bundle that this channel occupies.

DNS-SD Implementation

Using DNS-SD as the service discovery implementation, the additional bundle field in a channel advertisement would appear as follows:

Record: keyboardgstage-box._netaudio_chan._udp.local TXT
txtvers=2
rate=48000
bits=24
enc=1
b.b1=1

The fields relating specifically to dynamic bundles—"nchan" and "id"—have been omitted. In their place is a field "b.b1=1". "b." specifies that this field is a static bundle reference. "b1" specifies that the name of the bundle is "b1". The value "1" specifies that keyboard occupies slot 1 in the bundle.

The bundle is assumed to reside on the same device as the channel. "keyboard@stage-box" is specified as being part of bundle "b1", which is implicitly "b1@stage-box".

Static Bundle Advertisement

Like channels, bundles are advertised 806 as "name@device". However, a single bundle advertisement might resolve to several different bundles, each of which has the same format but a different destination address (see the discussion on redundancy discussed below).

The bundle advertisement has four parts:
  Bundle network name: b1@stage-box. This is used as a search key by service discovery.
  Bundle channel format. In this case b1 48 kHz, 24 bit, PCM encoded. All channels in a bundle have an identical format.
  Bundle destination address and port: 239.254.46.46, port 29061.
  Number of slots in bundle. In this case, two.

Only the destination information varies between multiple versions of the same bundle. All bundles sharing a bundle network name also share the channel format and number of slots.

The bundle name is an arbitrary identifier used by APEC 122. It is not normally visible to users, and has no semantic meaning except as a token. It would be possible to support user configuration of bundle names via the GUI 149, such as naming the bundle b1 "keyboard-and-guitar" using the GUI 149.

DNS-SD Implementation

In this example, there are two bundle advertisements "b1@stage-box" and "b2@stage-box". Using DNS-SD as the service discovery protocol, a bundle advertisement for bundle b1 would appear as follows:
  Record: b1@stage-box._netaudio_bund._udp.local SRV 0129061 46.46.254.239.mcast.local
  Record: b1@stage-box._netaudio_bund._udp.local TXT txtvers=1 rate=48000
bits=24
enc=1
nchan=2

All bundles with the same name share a single TXT record. There is one SRV record per destination address. SRV records do not contain addresses, but instead a target domain name. When stage-box 110 claimed the address 239.254.46.46 it created a special record. Resolving this record provides the domain name.

Record: 46.46.254.239.mcast.local IN A 239.254.46.46

The "nchan" field is the number of channels (slots) in this bundle.

Subscription

Subscription 808 is handled identically to the unicast example. Like the unicast case, the first action is to select 808(*a*) and resolve 808(*b*) the advertisements. Then these selections are aggregated 808(*c*). When dealing with static bundles, channels can be aggregated if the channel formats are the same and they share any one static bundle.

Once aggregation is done, the APE 124 can be configured to receive packets. Because the packets are already being transmitted, there is no need to request the transmitting APEC 122 to create a new bundle. However, the packets being received may contain unwanted channels.

In this case the APEC 126 selects the channels keyboard, guitar and CD-Right. Detailed advertisements for these channels are obtained using DNS-SD 118. Through aggregation it is determined that the subscription will be to bundles b1 and b2, but the first slot in b2 will be ignored. The APEC 126 configuration message 808(*d*) directs the APE 124 to ignore the CD-Left channel.

Locally, mixer 112 sends 808(*d*) the following 'create RX bundle' messages from its APEC 126 to its APE 124 to configure the APE 126 for each bundle:

| Field | Value | Notes |
| --- | --- | --- |
| Destination address | 239.254.48.48 | Mixer's primary data interface address |
| Destination port | 29061 | |
| Interface | 0 | Primary data interface is #0 |
| Number of channels | 2 | |
| Map for slot 1 | [8] | Array with one element: RX channel 1 |
| Map for slot 2 | [11] | Array with one element: RX channel 4 |
| Destination address | 239.254.189.72 | Mixer's primary data interface address |
| Destination port | 29064 | |
| Interface | 0 | Primary data interface is #0 |
| Number of channels | 2 | |
| Map for slot 1 | [0] | Array with no element: ignore this message |
| Map for slot 2 | [14] | Array with one element: RX channel 7 |

The receiver 112 now starts receiving 810 and is able to route for b1 slot 1 (keyboard) to RX channel 1, slot 2 (guitar) to RX channel 4. For b2 slot 1 (CD-Left) is discarded and slot 2 (CD-Right) is routed to RX channel 7.

Combining Multicast and Unicast

Many transmitters support both multicast and unicast. A channel can be advertised with both a dynamic configuration port and one or more static bundles. During aggregation the receiver APEC must determine the best method of subscribing to the selected channels. Generally, a receiver should attempt to configure it's APE to receive static bundles in preference to creating dynamic bundles. However, a device across a wireless link (notoriously poor multicast/broadcast performance) might prefer dynamic bundles.

When there are multiple equally suitable static bundles, the SRV weight field can be used to choose between them. Bundles with higher weights should be preferred to those with lower weights. In this example, all weights are '1'. Alternatively, two channels can share one static bundle but not another. Regardless of weights, the receiver should prefer to configure fewer bundles where possible.

Mostly, unicast is configured to use dynamic bundles and multicast is configured to use bundles. The opposite is permissible, however. A static bundle might be configured unicast to deliberately send data to a receiver that is not on the local network. Receivers need to verify the addresses of static bundles since the address might not be valid for that receiver.

Redundancy

Figure 9:
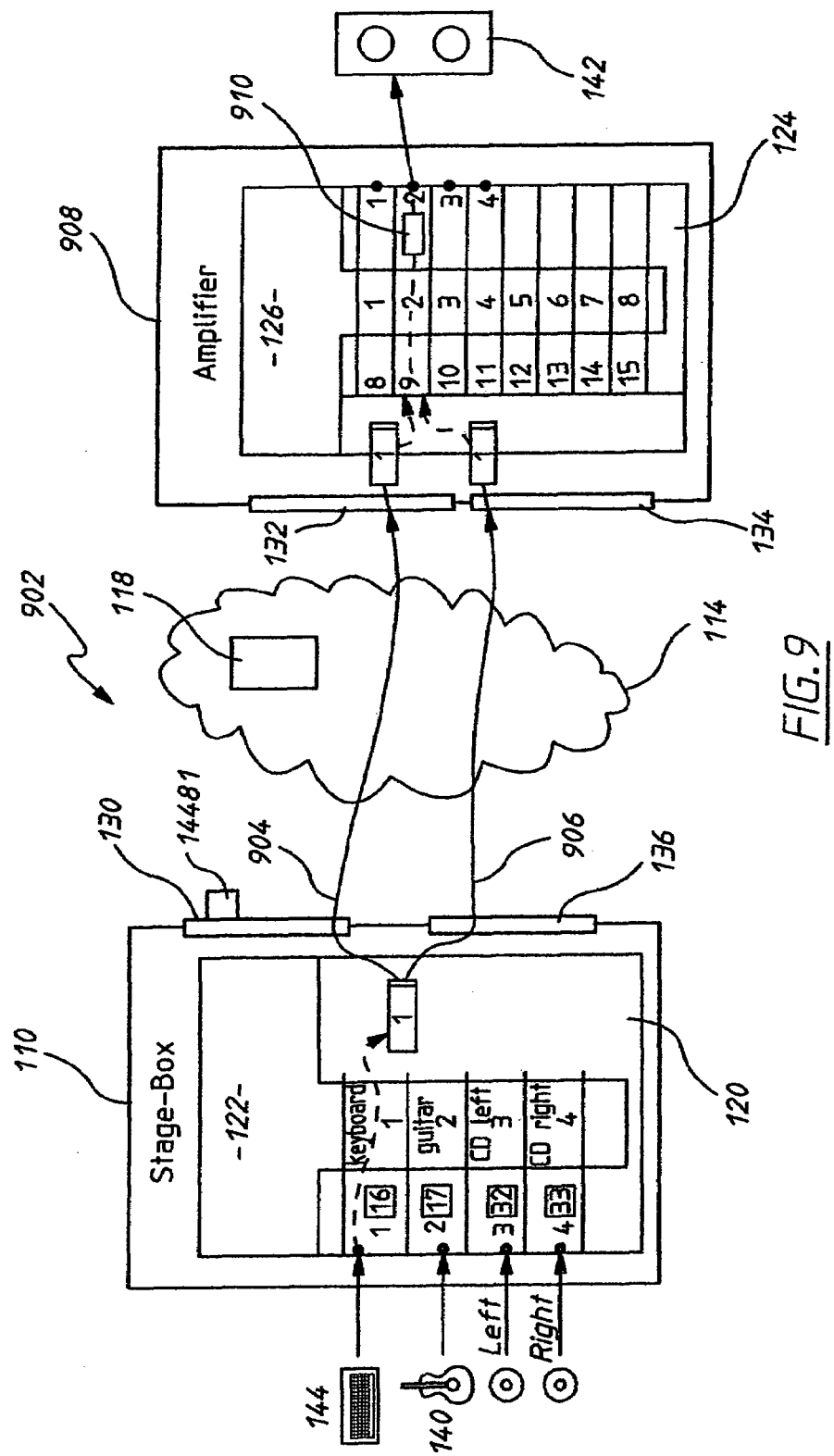
FIG. 9 is a further schematic diagram of a network using redundant interfaces in according to a fourth embodiment of the invention.

Redundancy will now be described with reference to FIG. 9. Redundancy is achieved by duplicating packet streams over different interfaces of an APE. Redundancy is mainly controlled at the APEC layer. An APEC can program a given packet stream on the APE to be sent or received on a particular data interface. If a particular media packet stream is to be transmitted redundantly then the APEC programs two or more copies of the packet stream. One copy to be sent from the first interface 130 of the APE 120, and a second copy of the packet stream to be sent from the second interface 136 of the APE 120.

Similarly, the receiving APEC 126 programs its APE 124 to receive a copy on each data interface 132 and 134. Each duplicate packet stream is programmed to copy samples to the same output channels. This means the packet streams are written to the same buffer. Since the samples and associated time stamps are identical in both packet streams, identical samples are processed and overwritten in buffer for the output channel. Normally, this would result in errors and race conditions. Since all redundant bundles contain identical samples synchronized by timestamps it does not matter sample data is written first to the buffer, as only one copy of each sample will actually be sent to the output channel since all duplicates are simply overwritten.

It is also possible to transmit an individual channel redundantly by adding the channel to multiple distinct bundles.

Figure 8:
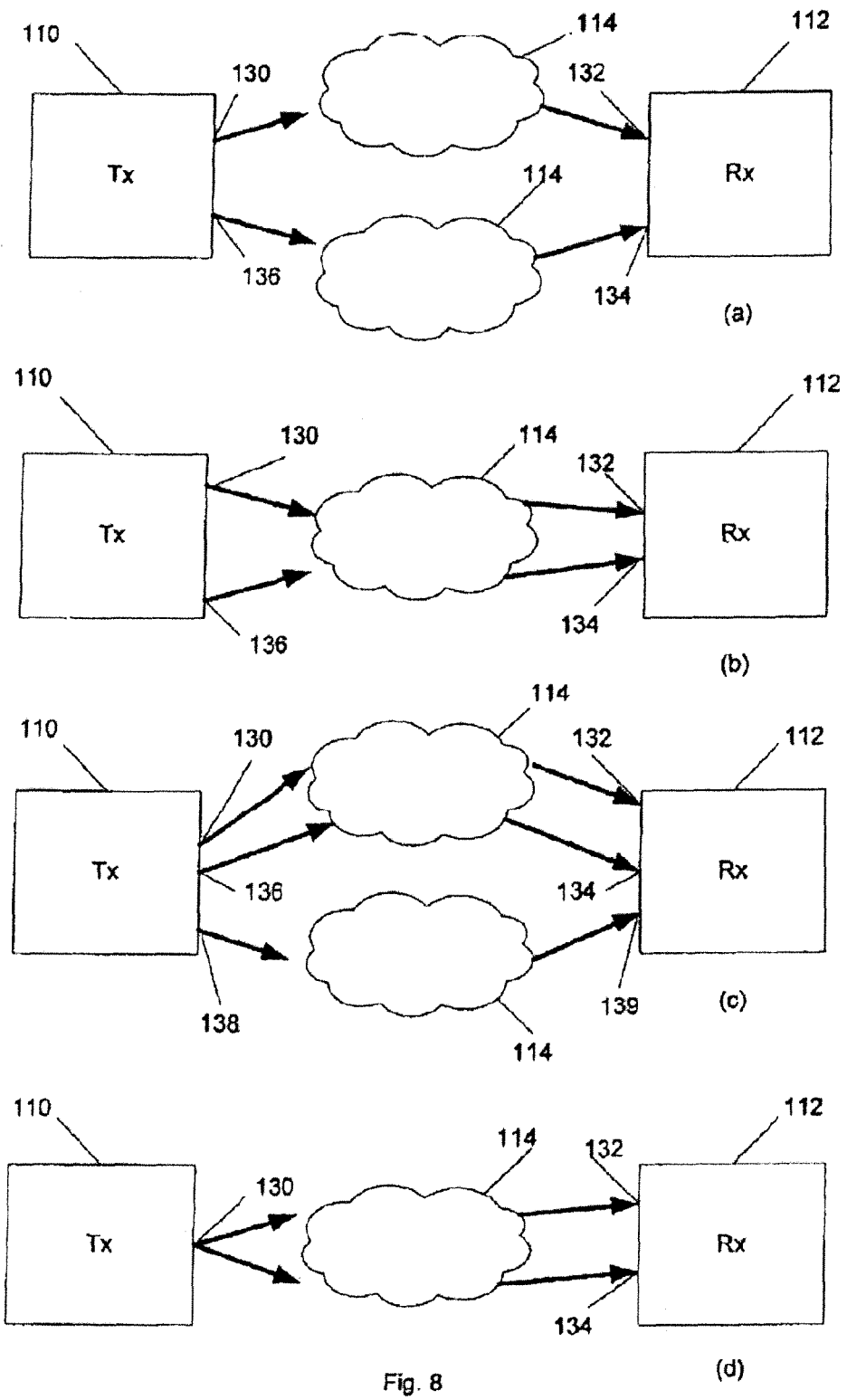
FIGS. 8(a) to 8(d) is a schematic view of how redundancy can be implemented in the data network.

FIG. 8 shows some of the ways in which redundancy can be implemented on a data network. The interfaces can be connected to independent networks or to a single network via multiple paths. Interfaces 138 and 139 in FIG. 8(*c*) are the second redundant interfaces of the transmitter 110 and receiver 112 respectively. FIG. 8(*d*) shows that the one interface on the transmitter 110 can transmit to separate interfaces on the receiver 112.

APEs and Interfaces

APEs 120 and 124 with multiple channel data interfaces each designate one interface as primary. This is interface #0. Any further (redundant) channel data interfaces are numbered from 1. For example, the APE 124 of FIG. 7 with one primary 132 and one redundant 134 interface has interfaces #0 and #1.

When transmitting or receiving, for simplicity APEs 120 and 124 are configured to only send or receive to equivalent interfaces. The primary interface 130 on one APE 120 communicates with primary interface 132 on the other APE 124. Interface 136 #1 on one APE 120 communicates only with interface 134 #1 on the other APE 124. And so on. This allows each APE interface to be marked externally. On the hardware itself, the primary interfaces might be colored black, first redundant interfaces as red, secondly redundant interfaces as blue, and so on. This makes it easy for a user to distinguish between the differing interfaces and ensure they are wired correctly during set up 500.

Unicast Redundancy

The field "nred" may be included in an advertisement TXT record. The value indicates the number of redundant interfaces. If omitted, the value is treated as zero. A value of zero indicates no redundant interfaces meaning that the APE supports a primary data stream only. A value of 1 indicates a single redundant interface. Values greater than 1 indicate multiple redundant interfaces (numbered 1 . . . n).

Rather than send a single dynamic bundle request, the receiving APEC 126 may also send one request per redundant interface available on the transmitter, each with a different interface field. Alternatively, the request for the redundant stream to the redundant interface may be incorporated into the original request message for the packet stream to the non-redundant interface.

Figure 7:
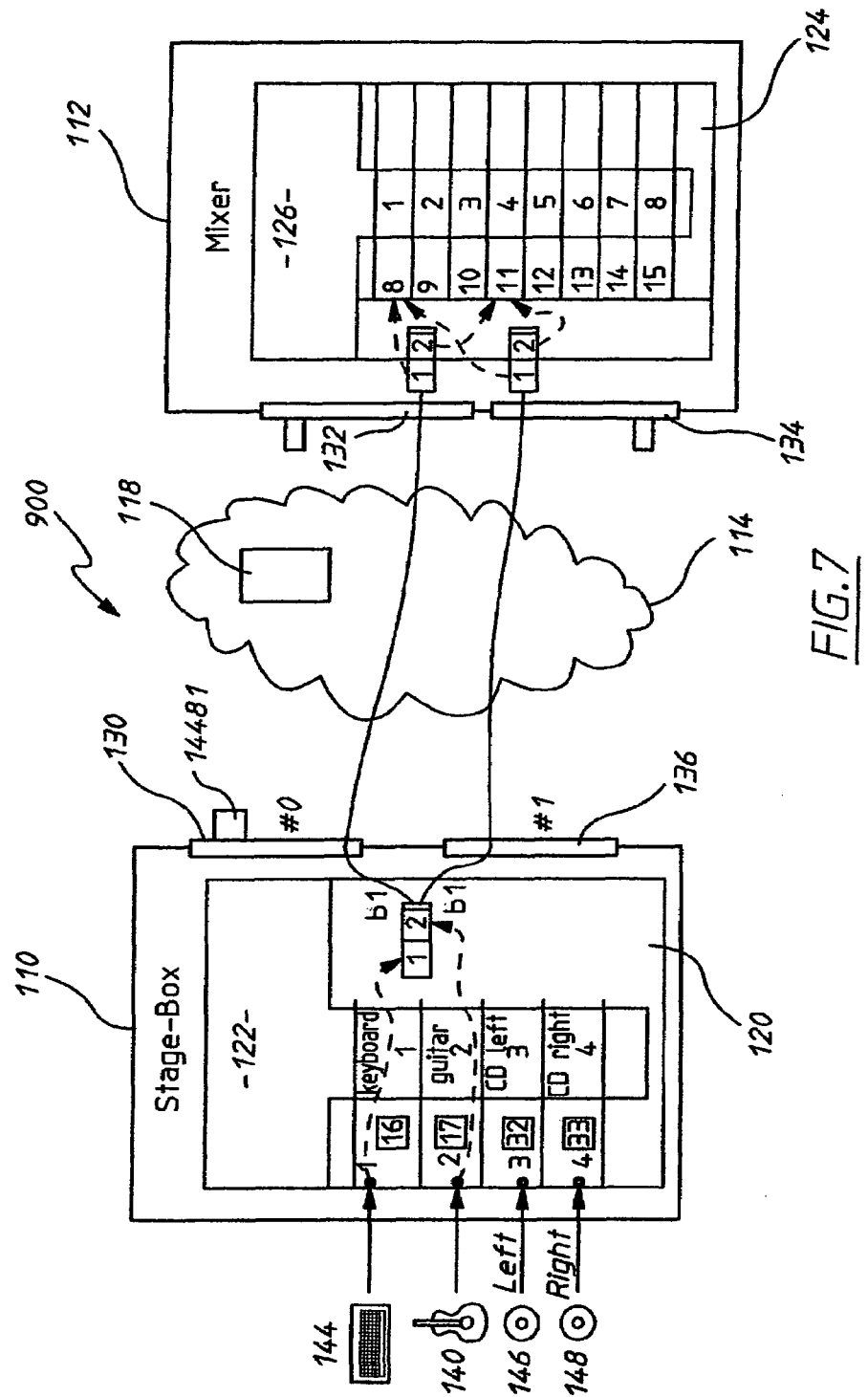
FIG. 7 is a schematic diagram of the network using redundant interfaces in accordance with a third embodiment of the invention.

As shown in FIG. 7, stage-box 110 has a redundant interface 136 (#1) in addition to the primary interface 130 (#0). The TXT record of the channel advertisement is now formatted as follows:

Record: keyboardstage-box._netaudio_chan._udp.local TXT
    txtvers=2
    rate=48000
    bits=24
    enc=1
    nchan=4
    id=16
    nred=1

Mixer 112 also supports a redundant channel. Its primary data interface has address 169.254.28.12 (according to the example described above). Its secondary data interface has address 169.254.132.15.

Locally, mixer 112 sends the following 'create RX bundle' messages from its APEC 126 to its APE 124:

| Field | Value | Notes |
| --- | --- | --- |
| Destination address | 169.254.28.12 | Mixer's primary data interface address |
| Destination port | 26528 | |
| Interface | 0 | Primary data interface is #0 |
| Number of channels | 2 | |
| Map for slot 1 | [8] | Array with one element: RX channel 1 |
| Map for slot 2 | [11] | Array with one element: RX channel 4 |
| Destination address | 169.254.132.15 | Mixer's secondary data interface address |
| Destination port | 28452 | |
| Interface | 1 | Secondary data interface is #1 |
| Number of channels | 2 | |
| Map for slot 1 | [8] | Array with one element: RX channel 1 |
| Map for slot 2 | [11] | Array with one element: RX channel 4 |

Each message configures one received packet stream to one of the interfaces. The secondary interface 134 (#1) might use the same port number as the primary interface 132 or a different one, depending on the APE 124 design. This example assumes that a different port is chosen.

Just as mixer 112 must create two separate bundles on its APE 124, it must create two separate dynamic bundles on stage-box 110. The following messages are sent to stage box 110 from the APEC 126:

| Field | Value | Notes |
| --- | --- | --- |
| Destination address | 169.254.28.12 | Mixer's primary data interface address |
| Destination port | 26528 | |
| Interface | 0 | Primary data interface is #0 |
| Number of slots | 2 | |
| Slot 1 | 16 | ID of keyboard@stage-box |
| Slot 2 | 17 | ID of guitar@stage-box |
| Destination address | 169.254.132.15 | Mixer's secondary data interface address |
| Destination port | 28452 | |
| Interface | 1 | Secondary data interface is #1 |
| Number of slots | 2 | |
| Slot 1 | 16 | ID of keyboard@stage-box |
| Slot 2 | 17 | ID of guitar@stage-box |

Finally, stage-box 110 creates two bundles on the local APE 120 to fulfill these requests:

| Field | Value | Notes |
| --- | --- | --- |
| Destination address | 169.254.28.12 | Mixer's primary data interface address |
| Destination port | 26528 | |
| Interface | 0 | Primary data interface (on stage-box) is #0 |
| Number of channels | 2 | |
| TX Channel for slot 1 | 16 | TX Channel 1 |
| TX Channel for slot 2 | 17 | TX Channel 2 |
| Destination address | 169.254.132.15 | Mixer's secondary data interface address |
| Destination port | 26452 | |
| Interface | 1 | Secondary data interface (on stage-box) is #1 |
| Number of channels | 2 | |
| TX Channel for slot 1 | 16 | TX Channel 1 |
| TX Channel for slot 2 | 17 | TX Channel 2 |

Multicast Redundancy

To support redundant multicast, the transmitter 110 creates several different packet streams and advertises them as separate static bundles associated with a single bundle name.

For example, to advertise two copies of bundle b1 as described in the previous multicast example, one primary 130 and one secondary 136, stage-box 110 would first claim a multicast address for each bundle. The primary bundle uses 239.254.46.46 (as the previous example). The secondary bundle uses 239.254.98.147. For this example, assume both use the same port (29061).

Two SRV records are created, one for each packet stream. Since each packet stream is identically formatted, only a single TXT record is required.

Record: b1@stage-box._netaudio_bund._udp.local SRV 0129061 46.46.254.239.mcast.local
Record: b1@stage-box._netaudio_bund._udp.local SRV 1129061 147.98.254.239.mcast.local
Record: b1@stage-box._netaudio_bund._udp.local TXT
    txtvers=1
    rate=48000
    bits=24
    enc=1
    nchan=4

If only a single (primary) interface is used, the "priority" field (which is represented as the first number) in the SRV is set 0. A non-zero priority indicates that the bundle applies to a redundant interface, in this case interface 1.

Decoding these bundle advertisements allows the receiver to configure appropriate bundles on each interface. The APEC 126 configures the APE 124 to receive the primary bundle on the first primary interface 132 and the second bundle on the secondary interface 134.

It will be appreciated by persons skilled in the art that numerous variations and/or modifications may be made to the invention as shown in the specific embodiments without departing from the spirit or scope of the invention as broadly described.

When using static bundles, channels can be assigned to bundles in any convenient manner. It is also possible to implement redundancy by creating specific bundles on specific interfaces.

Dynamic bundles are usually unicast. Static bundles are usually multicast. If required, it is possible to configure dynamic bundles as multicast or static bundles as unicast.

A particular channel can be configured to work with both unicast and multicast. Standard policy is that receivers should prefer multicast to unicast since the resource requirements have already been paid for multicast. Individual receivers may override this policy.

Revocation of advertisements is possible. There are certain rules governing revocation (and address reuse) to ensure that configured bundles are removed correctly. The revocation rules are such that the system will continue to operate if the configuration information becomes temporarily inaccessible. Existing configurations cannot be changed, but they do not automatically terminate.

Physical channel inputs/outputs could also be implemented in software, such as in the software of the mixer, they don't have to be real physical plugs.

While these examples assume sampled audio data, the exact same protocol mechanisms will work for any fixed-size periodic data stream. Non-periodic or variable sized data can also be supported with variations to the transport (packet & bundling) mechanisms.

Assigning homogeneous channels to slots is an implementation convenience. Non-homogenous channel media data with a common sample rate can be identified in a frame using a start byte and length.

The system can handle any data that can be expressed in the advertisements. For example, we define an advertisement format that represents a frame of compressed video. At the simplest, we could advertise a single video stream utilising the same exact global timestamps used by the audio packets and then use the UI to tell APECs (or equivalent) which ones we wanted routed where. The APECs would discover the available video channels and automatically arrange the routing. Unlike an uncompressed audio sample, a frame of compressed video is often not constant size. However, if each frame contained a size value then a receiving APEC could request that three such frames from different streams be placed in each "frame" of each packet and know how to decode them. A sophisticated advertisement system could even specify a bundle (and thus packet) format that consisted of one frame of video followed by several frames of audio, all synchronised even though they have different sample rates. Mixing frame sizes and sample rates requires a more complex advertisement scheme.

MIDI is an example of non-periodic data. The same interface that allows a user to abstractly route audio to audio and video to video can route MIDI to MIDI. Like periodic packets, MIDI packets would have a timestamp, but there would not be the expectation of receivers that units of MIDI data would arrive periodically. Non-periodic data might need a periodic 'keepalive' message to distinguish between a quiet and a non-functional stream. Non-periodic data can be automatically aggregated as easily as periodic data as long as there is a flag to say "none of this data in this packet".

Although using the system only for homogeneous audio makes advertisement and packet parsing simpler, as shown by the embodiments of the invention it is not required for the system to work. The same user interface that allows the user to set up audio routing requests and then let the system figure them out will work for any sort of streamed packet data.

Algorithms for automatic allocation of addresses are not shown. Some of these exist already (e.g. link-local unicast); others need to be specified (e.g. link-local multicast). It is also possible to use centrally configured addresses (such as via DHCP).

The "unicast mode" behaviour ('dynamic bundles': receiver aggregates and creates bundles) can be used with multicast addresses. Also the "multicast mode" behaviour ('static bundles': transmitter sends pre-created bundles and receivers pick the channels (and thus bundles) they want) can be used with unicast addresses.

The present embodiments are, therefore, to be considered in all respects as illustrative and not restrictive.

Claims defining the invention are as follows:

1. A receiver device for receiving media packet streams from a data network, the receiver device comprising:
    a data interface to receive media packet streams, the media packet streams containing one or more user selected media channels;
    a processor to extract the user selected media channels from the received media packet streams; and
    a controller configured to:
        a) receive information, from a user interface, on a user selection of media channels advertised on the data network,
        b) receive configuration information from a service discovery database and separate from the media packet streams, on the transmission source and format of the one or more of the user selected media channels to enable the controller to create a croup of user selected media channels in which the user selected media channels that can be transmitted from the same transmission source and have the same format are included in the group, and
        c) automatically provide instructions to the processor indicating that a media packet stream comprising said group of channels is to be received, which user selected media channels are included in said group and the number of user selected media channels in the media packet stream;
    wherein the receiver is further configured to receive information on whether the user selected media channels can be received statically or dynamically, and if the media channels in said group can be received dynamically, the receiver is configured to transmit a request to the transmission source to create a media packet stream comprising only the media channels included in the group.

2. A receiver device according to claim 1, wherein the selected media channels each have a format and the controller further operates to receive information, from the service discovery database, on the format of each of the selected media channels so as to group the selected media channels with reference to the format of the selected media channels.

3. A receiver device according to claim 1, wherein the media packet stream comprising a group of media channels also contains media channels that are not the selected media channels of that group.

4. A receiver device according to claim 1, wherein the controller is remote from the processor and/or the data interface.

5. A receiver device according to claim 1, wherein information about the transmission source includes network parameters of the transmission source.

6. A receiver device according to claim 5, wherein the network parameters include an IP address and configuration port identifier.

7. A receiver device according to claim 1, wherein the transmission source is a transmitter device.

8. A receiver device according to claim 7, wherein a transmitter device is a stage-box.

9. A receiver device according to claim 1, wherein for each selected media channel the controller further receives information, from the service discovery database, on the methods by which the selected media channel can be received.

10. A receiver device according to claim 9, wherein the method by which the selected media channel can be received is within one or more pre-defined media packet streams using multicast protocol.

11. A receiver device according to claim 9, wherein the method by which the selected media channel can be received is on request to the transmission source using unicast protocol.

12. A receiver device according to claim 11, wherein the controller further operates to send a request to receive a media packet stream containing the one or more selected media channels of a group.

13. A receiver device according to claim 1, wherein the controller further operates to determine the preferred method of receiving the selected media channel.

14. A receiver device according to claim 1, wherein the controller provides further instruction to the processor on which output channels the extracted selected media channels should be routed to.

15. A receiver device according to claim 1, wherein the receiver is a mixer.

16. A receiver device according to claim 1, wherein the receiver device comprises two or more data interfaces, and the controller provides further instruction to the processor on which data interface each media packet stream will be received.

17. A receiver device according to claim 16, wherein the controller further operates to send a request to receive a first media packet stream at a first data interface and a second media packet stream at the second data interface, wherein samples contained in the first and second media packet stream are the same.

18. A receiver device according to claim 1, wherein the information the controller receives on the user selection of media channels is indicative of a unique name of each user selected media channel that describes in words the source of the media channel.

19. A receiver device according to claim 1, wherein the controller further operates to send an indication of the advertised name of the media channel as a look-up-key to the service discovery database connected to the data network and to receive the media channel format information for the media channel.

20. A receiver device according to claim 1, wherein the media packet stream contains distinct or overlapping media channels having different bit depths, encodings and sample rates.

21. A method for receiving media packet streams from a data network, the method comprising:

receiving information, from a user interface, on a user selection of media channels advertised on the data network;

receiving configuration information from a service discovery database and separate from the media packet streams, on the transmission source and format of the one or more of the user selected media channels to create a group of user selected media channels in which the user selected media channels that can be transmitted from the same transmission source and have the same format are included in the group;

automatically providing instructions to a processor indicating that a media packet stream comprising said group of channels is to be received, which user selected media channels are included in said group and the number of user selected media channels in the media packet stream;

receiving information on whether the user selected media channels can be received statically or dynamically, and if the media channels in said group can be received dynamically, transmitting a request to the transmission source to create a media packet stream comprising only the media channels included in the group;

receiving one or more media packet streams; and extracting the user selected media channels from the received media packet streams.

* * * * *